(12) United States Patent
Li (10) Patent No.: US 12,101,558 B2
(45) Date of Patent: Sep. 24, 2024

(54) PAN-TILT-ZOOM CAMERA CONTROL METHOD AND DEVICE, PAN-TILT-ZOOM CAMERA, AND STORAGE MEDIUM

(71) Applicant: ZHEJIANG UNIVIEW TECHNOLOGIES CO., LTD., Zhejiang (CN)

(72) Inventor: Yuxiang Li, Zhejiang (CN)

(73) Assignee: ZTE Corporation, Shenzhen (CN)

( * ) Notice: Subject to any disclaimer, the term of this patent is extended or adjusted under 35 U.S.C. 154(b) by 117 days.

(21) Appl. No.: 17/912,335

(22) PCT Filed: Apr. 27, 2020

(86) PCT No.: PCT/CN2020/087186
§ 371 (c)(1),
(2) Date: Sep. 16, 2022

(87) PCT Pub. No.: WO2021/184495
PCT Pub. Date: Sep. 23, 2021

(65) Prior Publication Data
US 2023/0042555 A1 Feb. 9, 2023

(30) Foreign Application Priority Data
Mar. 16, 2020 (CN) .......................... 202010181739.2

(51) Int. Cl.
*H04N 23/695* (2023.01)
(52) U.S. Cl.
CPC ................................ *H04N 23/695* (2023.01)
(58) Field of Classification Search
CPC ....... H04N 23/695; H04N 7/18; G03B 17/561
See application file for complete search history.

(56) References Cited

U.S. PATENT DOCUMENTS

| 10,158,799 B2 | 12/2018 | Eguchi et al. |
| 2007/0126872 A1* | 6/2007 | Bolotine ............... H04N 23/50 348/E7.086 |

(Continued)

FOREIGN PATENT DOCUMENTS

| CN | 101379368 A | 3/2009 |
| CN | 102497507 A | 6/2012 |

(Continued)

OTHER PUBLICATIONS

International Search Report in Application No. PCT/CN2020/087186 dated Dec. 16, 2020, 4 pages including English Translation.

(Continued)

*Primary Examiner* — Michael Lee
(74) *Attorney, Agent, or Firm* — Morgan, Lewis & Bockius LLP (57) ABSTRACT

Provided are a pan-tilt-zoom camera control method and apparatus, a pan-tilt-zoom camera and a storage medium. The method includes following steps. A clockwise path and a counterclockwise path for a pan-tilt-zoom camera to rotate from a current preset position to a target preset position are determined; a current rotation path is selected from the clockwise path and the counterclockwise path according to life load values of at least two first position points that the clockwise path needs to pass and life load values of at least two second position points that the counterclockwise path needs to pass, where a life load value is used for characterizing the total number of times that the pan-tilt-zoom camera passes a preset position point in a pan and tilt; and the pan-tilt-zoom camera is controlled to rotate from the current preset position to the target preset position according to the current rotation path.

14 Claims, 3 Drawing Sheets

(56) References Cited

U.S. PATENT DOCUMENTS

| | | |
|---|---|---|
| 2010/0114338 A1 | 5/2010 | Bandyopadhyay et al. |
| 2017/0230580 A1* | 8/2017 | Ohara .................. H04N 23/69 |
| 2018/0250788 A1 | 9/2018 | Lau et al. |
| 2019/0182426 A1 | 6/2019 | Higashi |
| 2019/0186954 A1 | 6/2019 | Xiong et al. |
| 2022/0302663 A1* | 9/2022 | Imamura ................ H01R 39/10 |

FOREIGN PATENT DOCUMENTS

| | | | |
|---|---|---|---|
| CN | 104233714 A | | 12/2014 |
| CN | 106774451 A | | 5/2017 |
| CN | 108134904 A | | 6/2018 |
| CN | 108289196 A | | 7/2018 |
| CN | 110187721 A | | 8/2019 |
| JP | 2013030968 A | * | 2/2013 |
| WO | WO2019127344 A1 | | 7/2019 |

OTHER PUBLICATIONS

Extended European Search Report in Application No. 20926108.0 dated Feb. 9, 2024, 10 pages.

\* cited by examiner

PAN-TILT-ZOOM CAMERA CONTROL METHOD AND DEVICE, PAN-TILT-ZOOM CAMERA, AND STORAGE MEDIUM

CROSS REFERENCE TO RELATED APPLICATIONS

This is a National Stage Application filed under 35 U.S.C. 371 based on International Patent Application No. PCT/CN2020/087186, filed on Apr. 27, 2020, which claims priority to Chinese Patent Application No. 202010181739.2 filed on Mar. 16, 2020, the disclosures of both of which are incorporated herein by reference in their entireties.

TECHNICAL FIELD

Embodiments of the present application relate to the technical field of security monitoring, for example, a pan-tilt-zoom camera control method and apparatus, a pan-tilt-zoom camera and a storage medium.

BACKGROUND

In the field of security monitoring, pan-tilt-zoom cameras have been widely used. Compared with a common camera, the pan-tilt-zoom camera can rotate freely up, down, left and right. The current pan-tilt-zoom cameras generally have the function of unrestricted rotation for 360°. To avoid wire winding during the rotation of the camera and to achieve unhindered transmission of interactive information, a rotation communication device, that is, a slip ring, is disposed on the pan-tilt-zoom camera. The slip ring is installed at the rotation center of the pan-tilt-zoom camera and connects the rotating part and the stationary part of the pan-tilt-zoom camera for transmitting information.

The pan-tilt-zoom camera is generally provided with multiple preset positions and can uninterruptedly rotate back and forth between the multiple preset positions, so as to monitor different scenes at different preset positions. However, long-term and frequent rotation of the pan-tilt-zoom camera often leads problems such as the damage of the electric brush of the slip ring, the damage of loops, and the fracture of cables due to friction, resulting in the loss of image transmission signals. Therefore, the service life of the slip ring and cables causes the bottleneck of the rotation life of the pan and tilt, so that improving the rotation life of the pan-tilt-zoom camera becomes an urgent problem to be solved in the security field.

At present, the improvement of the rotation life of the pan and tilt generally relies on the improvement of the life of hardware components. For example, the electric brush of the slip ring with better wear resistance and materials for loops of the slip ring with better wear resistance are selected; cables of the slip ring with better wear resistance are selected; and the structure of the slip ring is optimized. However, these manners require higher hardware costs.

SUMMARY

Embodiments of the present application provides a pan-tilt-zoom camera control method and apparatus, a pan-tilt-zoom camera and a storage medium, so as to improve the rotation life of the pan-tilt-zoom camera without increasing hardware costs.

The embodiments of the present application provide a pan-tilt-zoom camera control method including steps described below.

A clockwise path and a counterclockwise path for a pan-tilt-zoom camera to rotate from a current preset position to a target preset position are determined.

A current rotation path is selected from the clockwise path and the counterclockwise path according to life load values of at least two first position points that the clockwise path needs to pass and life load values of at least two second position points that the counterclockwise path needs to pass, where a life load value is used for characterizing the total number of times that the pan-tilt-zoom camera passes a preset position point in a pan and tilt.

The pan-tilt-zoom camera is controlled to rotate from the current preset position to the target preset position according to the current rotation path.

The embodiments of the present application provide a pan-tilt-zoom camera control apparatus. The apparatus includes a first path determination module, a second path determination module and a rotation control module.

The first path determination module is configured to determine a clockwise path and a counterclockwise path for a pan-tilt-zoom camera to rotate from a current preset position to a target preset position.

The second path determination module is configured to select a current rotation path from the clockwise path and the counterclockwise path according to life load values of at least two first position points that the clockwise path needs to pass and life load values of at least two second position points that the counterclockwise path needs to pass, where a life load value is used for characterizing the total number of times that the pan-tilt-zoom camera passes a preset position point in a pan and tilt.

The rotation control module is configured to control the pan-tilt-zoom camera to rotate from the current preset position to the target preset position according to the current rotation path.

The embodiments of the present application further provide a pan-tilt-zoom camera. The pan-tilt-zoom camera includes at least one processor, and a storage apparatus configured to store at least one program.

The at least one program, when executed by the at least one processor, causes the at least one processor to implement the pan-tilt-zoom camera control method according to any embodiment of the present application.

The embodiments of the present application further provide a computer-readable storage medium configured to store a computer program which, when executed by a processor, implements the pan-tilt-zoom camera control method of any embodiment of the present application

DETAILED DESCRIPTION

The present application is described below in conjunction with drawings and embodiments. The embodiments described herein are merely intended to explain and not to limit the present application. In addition, for ease of description, only part, not all, of structures related to the present application are illustrated in the drawings.

Embodiment One

Figure 1A:
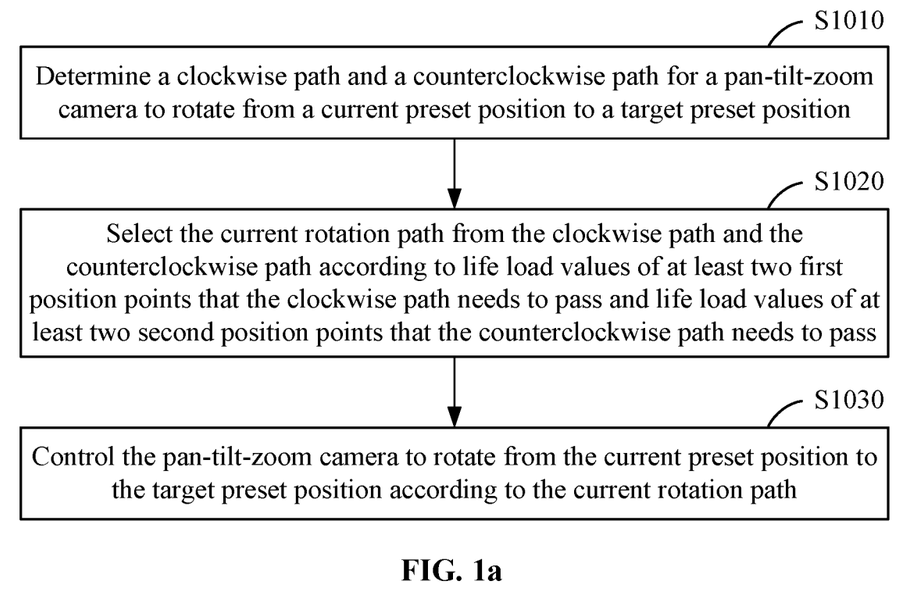
FIG. 1A is a flowchart of a pan-tilt-zoom camera control method according to embodiment one of the present application.

FIG. 1A is a flowchart of a pan-tilt-zoom camera control method according to embodiment one of the present application. The embodiment is applicable to a case of improving the service life of the pan-tilt camera, and the method may be executed by a pan-tilt-zoom camera control apparatus. The apparatus may be implemented by means of software and/or hardware and may be integrated on a pan-tilt-zoom camera.

As shown in FIG. 1A, the pan-tilt-zoom camera control method includes steps described below.

In S1010, a clockwise path and a counterclockwise path for a pan-tilt-zoom camera to rotate from a current preset position to a target preset position are determined.

In an embodiment, a preset position is used for characterizing a monitored key area and the operation of the pan-tilt-zoom camera. Generally, multiple preset positions are set in advance for the pan-tilt-zoom camera, and the pan-tilt-zoom camera rotates between the multiple preset positions according to a preset route. In an embodiment, during the actual rotation process of the pan-tilt-zoom camera, multiple rotation routes may be set. For example, four preset positions A, B, C and D are set for the pan-tilt-zoom camera, and the rotation routes set illustratively includes route 1, route 2 and route 3. In route 1, the pan-tilt-zoom camera circularly rotates from A to B to C to D; in route 2, the pan-tilt-zoom camera circularly rotates from A to C to D to B; in route 3, the pan-tilt-zoom camera circularly rotates from B to A to C to D. In this manner, based on the preceding set rotation routes, the pan-tilt-zoom camera circularly rotates according to route 1 during a first set time period, and circularly rotates according to route 2 during a second set time period. During the rotation process of the pan-tilt-zoom camera, before the pan-tilt-zoom camera rotates from the current preset position to the target preset position, it is required to determine the clockwise path and the counterclockwise path for the pan-tilt-zoom camera to rotate from the current preset position to the target preset position. For example, for route 1, the current preset position is B, and the target preset position is C, so that the clockwise path from B to C is B to C, and the counterclockwise path from B to C is B to A to D to C. The purpose of determining the clockwise path and the counterclockwise path for the pan-tilt-zoom camera to rotate from the current preset position to the target preset position is to ensure that one of the clockwise path and the counterclockwise path is subsequently selected as a current rotation path, so that after the pan-tilt-zoom camera rotates according to the current rotation path, the rotation life of loops of a slip ring and cables of the pan-tilt-zoom camera is ensured to be as long as possible.

In S1020, the current rotation path is selected from the clockwise path and the counterclockwise path according to life load values of at least two first position points that the clockwise path needs to pass and life load values of at least two second position points that the counterclockwise path needs to pass.

Optionally, the life load value of a preset position point is determined according to the total number of times that the pan-tilt-zoom camera passes the preset position point in a pan and tilt during a historical rotation process. For example, the total number of times that the pan-tilt-zoom camera passes a preset position point is directly taken as the life load value of the position point. In an embodiment, after the total number of times that the pan-tilt-zoom camera passes each position point in the clockwise path and the counterclockwise path during the historical rotation process is acquired, the greater the number of times that the pan-tilt-zoom camera passes a position point is (that is, the greater the life load value of the position point is), the more frequently the pan-tilt-zoom camera rotates according to the rotation path where the position point is located; as a result, the wear of the fixed area of the loops of the slip ring and the cables corresponding to the rotation path where the position point is located is greater than the wear of other areas of the loops of the slip ring and the cables, that is, the wear of various positions of the slip ring and the cables is uneven, which is not conducive to prolonging the life of the slip ring and the cables. Therefore, the current rotation path may be determined from the clockwise path and the counterclockwise path according to the life load values of the at least two first position points that the clockwise path needs to pass and the life load values of the at least two second position points that the counterclockwise path needs to pass, so that the number of times that the pan-tilt-zoom camera passes each position point in the rotating process is even.

In the embodiment of the present application, to acquire the life load value of each preset position point in the pan and tilt, that is, to acquire the total number of times that the pan-tilt-zoom camera passes each position point in the clockwise path and the counterclockwise path during the historical rotating process, optionally, for the horizontal rotation of the pan-tilt-zoom camera, rotation life statistical coordinates (X, Y) of each position point from 0° to 360° in the horizontal direction is pre-established, and a (X, Y) database is established. In an embodiment, the abscissa X represents the angle value at the horizontal orientation and is an integer value within a range (0, 359), and the factory default initial value of Y is zero. Thus, the factory default rotation life statistical coordinates of each position point of the pan-tilt-zoom camera are (0, 0), (1, 0), . . . , (358, 0) and (359, 0). In an embodiment, if the accuracy of the rotation of the pan and tilt is required to be high, the angle value at the horizontal orientation may be subdivided. For example, the value range of X is (0, 3599), and thus 3600 sets of data are obtained. The value of the ordinate Y is dynamically changed for counting the number of times that the pan-tilt-zoom camera passes the position point during rotation. In an embodiment, after each time of rotation of the pan-tilt-zoom camera, the value of the ordinate Y of each position point that the pan-tilt-zoom camera passes increases by a preset value (for example, increases by 1). Exemplarily, if the pan-tilt-zoom camera horizontally rotates from 10° to 70° clockwise, values of Y in (11, Y), (12, Y), . . . , (68, Y) and (69, Y) all increase by 1; if the pan-tilt-zoom camera rotates from 10° to 70° counterclockwise, values of Y in (9, Y), (8, Y), . . . , (72, Y) and (71, Y) all increase by 1. That is, the ordinate value of each position point characterizes the total number of times that the pan-tilt-zoom camera passes each position point during rotation. Therefore, as long as the ordinate value of each position point in the clockwise path and the counterclockwise path is obtained, the total number of times that the pan-tilt-zoom camera passes each position point in the clockwise path and the counterclockwise path during the historical process is obtained, and thus the life load value of each position point can be quickly determined. In an embodiment, the operation below may be followed. Coordinates of each position point in the clockwise path and coordinates of each position point in the counterclockwise path are acquired. According to the ordinate value of the coordinates of each position point in the clockwise path and the ordinate value of the coordinates of each position point in the counterclockwise path, the number of times that the pan-tilt-zoom camera passes each position point in the clockwise path and the number of times that the pan-tilt-zoom camera passes each position point in the counterclockwise path during the historical process are acquired, that is, the life load value of each position point is determined. The principle of the vertical rotation of the pan-tilt-zoom camera is the same as the principle of the horizontal rotation of the pan-tilt-zoom camera. Similarly, rotation life statistical coordinates (X', Y') of each position point on the vertical plane may be established, and a (X', Y') database is established. X' represents the angle value of each position point on the vertical plane, and Y' represents the total number of times that the pan-tilt-zoom camera passes each position point during the vertical rotation process, that is, the life load value of each position point.

In an embodiment, to prolong the rotation life of the loops of the slip ring and the cables of the pan-tilt-zoom camera as much as possible, it is required to ensure that various areas of the slip ring and the cables wear evenly, that is, it is required to dynamically adjust the rotation path of the pan-tilt-zoom camera, so that life load values of multiple position points that the pan-tilt-zoom camera passes are even. Therefore, the step in which the current rotation path is selected from the clockwise path and the counterclockwise path according to the life load values of the at least two first position points that the clockwise path needs to pass and the life load values of the at least two second position points that the counterclockwise path needs to pass includes steps described below.

In S110, the life load value of the clockwise path and the life load value of the counterclockwise path are determined according to the life load values of the at least two first position points that the clockwise path needs to pass and the life load values of the at least two second position points that the counterclockwise path needs to pass, respectively.

In an optional embodiment, the largest life load value of the life load values of the at least two first position points that the clockwise path needs to pass is taken as the life load value of the clockwise path; and the largest life load value of the life load values of the at least two second position points that the counterclockwise path needs to pass is taken as the life load value of the counterclockwise path.

In another optional embodiment, the average life load value of the life load values of the at least two first position points that the clockwise path needs to pass is taken as the life load value of the clockwise path; for example, the average life load value of life load values of all first position points that the clockwise path needs to pass is taken as the life load value of the clockwise path. The average life load value of the life load values of the at least two second position points that the counterclockwise path needs to pass is taken as the life load value of the counterclockwise path; for example, the average life load value of life load values of all second position points that the counterclockwise path needs to pass is taken as the life load value of the counterclockwise path. The average life load value of the life load values of the at least two first position points and the average life load value of the life load values of the at least two second position points are taken as the life load value of the clockwise path and the life load value of the counterclockwise path, respectively, so that it can be ensured that after the current rotation path is determined and the pan-tilt-zoom camera rotates, the wear of the loops of the slip ring and the cables is in the most even state as a whole.

In S210, the life load value of the clockwise path and the life load value of the counterclockwise path are compared, and the current rotation path is selected from the clockwise path and the counterclockwise path according to a comparison result.

Figure 1B:
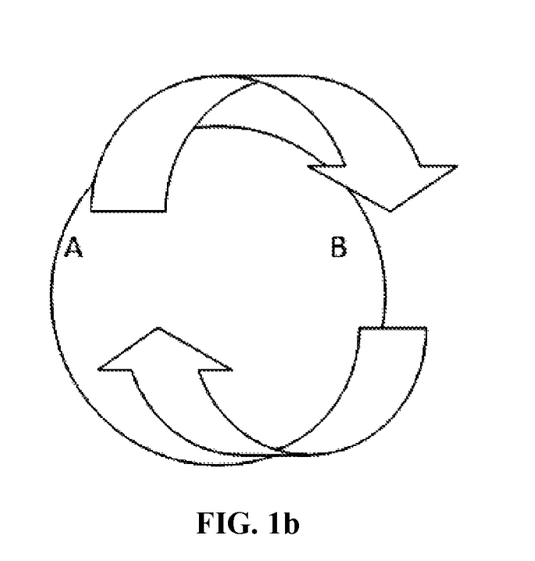
FIG. 1B is a diagram illustrating the rotation of a pan-tilt-zoom camera according to embodiment one of the present application.

Optionally, in a case where the life load value of the clockwise path is equal to the life load value of the counterclockwise path, a shorter path of the clockwise path and the counterclockwise path is taken as the current rotation path. The case where the life load value of the clockwise path is equal to the life load value of the counterclockwise path indicates that the slip ring and the cables of the pan-tilt-zoom camera wear evenly at this time, and to improve the rotation efficiency, the relatively short path of the clockwise path and the counterclockwise path is taken as the current rotation path. Exemplarily, referring to FIG. 1B, FIG. 1B is a diagram illustrating the rotation of the pan-tilt-zoom camera. A and B are two preset positions. After the pan-tilt-zoom camera rotates from point A to point B according to the clockwise path for a period of time, in a case where the pan-tilt-zoom camera needs to rotate from point B to point A and it is determined that the life load value of the clockwise path is equal to the life load value of the counterclockwise path, the pan-tilt-zoom camera may rotate from point B to point A according to the counterclockwise path to improve the rotation efficiency.

Optionally, in a case where the life load value of the clockwise path is not equal to the life load value of the counterclockwise path, the path having a smaller life load value of the clockwise path and the counterclockwise path is taken as the current rotation path. For example, if the life load value of the clockwise path is greater than the life load value of the counterclockwise path, that is, if the wear of the area of the slip ring and the cables corresponding to the clockwise path is greater than the wear of the area of the slip ring and the cables corresponding to the counterclockwise path, the counterclockwise path is determined as the current rotation path. If the life load value of the clockwise path is less than the life load value of the counterclockwise path, that is, if the wear of the area of the slip ring and the cables corresponding to the clockwise path is less than the wear of the area of the slip ring and the cables corresponding to the counterclockwise path, the clockwise path is determined as the current rotation path.

In S1030, the pan-tilt-zoom camera is controlled to rotate from the current preset position to the target preset position according to the current rotation path.

Based on the determination of the rotation path, it is only necessary to control the pan-tilt-zoom camera to rotate from the current preset position to the target preset position according to a specified rotation path, and thus it can be ensured that various position points at the slip ring and the cables of the pan-tilt-zoom camera wear evenly, so that the life of the slip ring and the cables can be prolonged as much as possible.

In an embodiment, after the pan-tilt-zoom camera rotates from the current preset position to the target preset position according to the current rotation path, the life load value of each position point in the rotation path increases by a preset value, so that the life load value of each position point can accurately count the total number of times that the pan-tilt-zoom camera passes each position point during the rotation process.

In the embodiment of the present application, the current rotation path is determined according to life load values of position points in the clockwise path and the counterclockwise path that the pan-tilt-zoom camera passes during the historical rotation process, so that after the pan-tilt-zoom camera rotates according to the current rotation path, life load values of various position points that the pan-tilt-zoom camera passes are even, and thus the loops of the slip ring and the cables of the pan-tilt-zoom camera wear evenly. In this manner, the rotation life of the pan-tilt-zoom camera can be improved without increasing the hardware costs of the pan-tilt-zoom camera.

Embodiment Two

Figure 2:
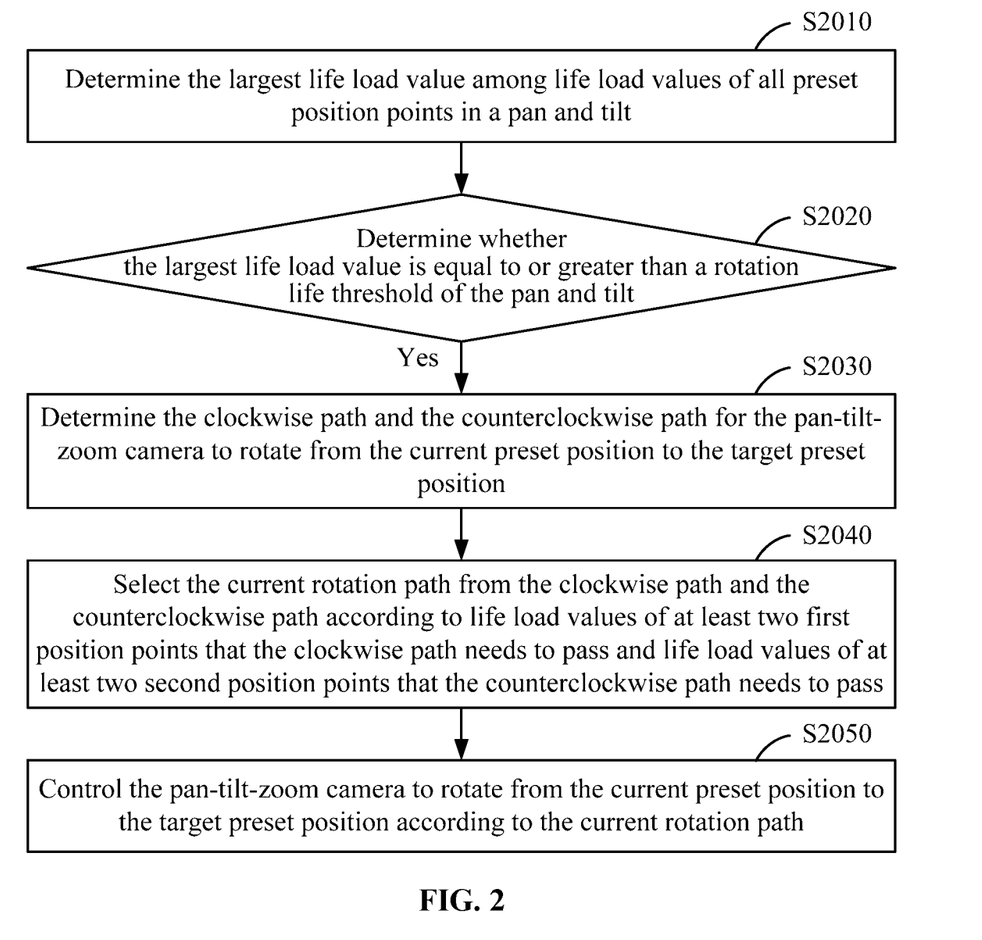
FIG. 2 is a flowchart of a pan-tilt-zoom camera control method according to embodiment two of the present application.

FIG. 2 is a flowchart of a pan-tilt-zoom camera control method according to embodiment two of the present application, and the embodiment is described based on the preceding embodiment. Referring to FIG. 2, the method includes steps described below.

In S2010, the largest life load value among life load values of all preset position points in a pan and tilt is determined.

Based on the preceding embodiment, the life load value of each position point may be determined according to the ordinate value of a preset position point, and the largest life load value among life load values of multiple position points can be determined through comparison.

In S2020, whether the largest life load value is equal to or greater than a rotation life threshold of the pan and tilt is determined, and in a case where the largest life load value is equal to or greater than the rotation life threshold of the pan and tilt, S2030 to S2050 are performed.

In the embodiment, the total rotation life of a pan-tilt-zoom camera in a case of rotating according to a shortest path is acquired first. The total rotation life corresponds to the friction life of various areas of the loops of the slip ring and the cables. The rotation life threshold is preset according to the total rotation life. For example, half of the total rotation life is taken as the rotation life threshold. To ensure the monitoring efficiency of the pan-tilt-zoom camera, the pan-tilt-zoom camera rotates according to the shortest path in a case where the rotation life is sufficient, that is, in a case where the largest life load value is less than the rotation life threshold of the pan and tilt. For example, a clockwise path and a counterclockwise path for the pan-tilt-zoom camera to rotate from a current preset position to a target preset position are determined, and the path having a smaller life load value (that is, the shortest path) of the clockwise path and the counterclockwise path is taken as a current rotation path. If the largest life load value is equal to or greater than the rotation life threshold of the pan and tilt, it indicates that the rotation life of the pan-tilt-zoom camera is insufficient, the rotation path needs to be determined according to S2030 to S2050, and the pan-tilt-zoom camera needs to rotate according to the rotation path, so that life load values of multiple position points after the pan-tilt-zoom camera rotates are even.

In an embodiment, the total rotation life may be obtained by testing multiple pan-tilt-zoom cameras. For example, total rotation lives of multiple pan-tilt-zoom cameras are tested, and the smallest total rotation life among the total rotation lives of the multiple pan-tilt-zoom cameras is taken as the total rotation life of the pan-tilt-zoom camera.

In S2030, the clockwise path and the counterclockwise path for the pan-tilt-zoom camera to rotate from the current preset position to the target preset position are determined.

In S2040, the current rotation path is selected from the clockwise path and the counterclockwise path according to life load values of at least two first position points that the clockwise path needs to pass and life load values of at least two second position points that the counterclockwise path needs to pass.

In S2050, the pan-tilt-zoom camera is controlled to rotate from the current preset position to the target preset position according to the current rotation path.

In the embodiment of the present application, the pan-tilt-zoom camera rotates according to the shortest path strategy in the case where the rotation life is sufficient, so that the rotation efficiency and the user experience can be ensured. In a case where the rotation life is insufficient, the rotation path is determined in an even-load manner, so as to ensure the maximum use of the life of the slip ring and the cables.

Embodiment Three

Figure 3:
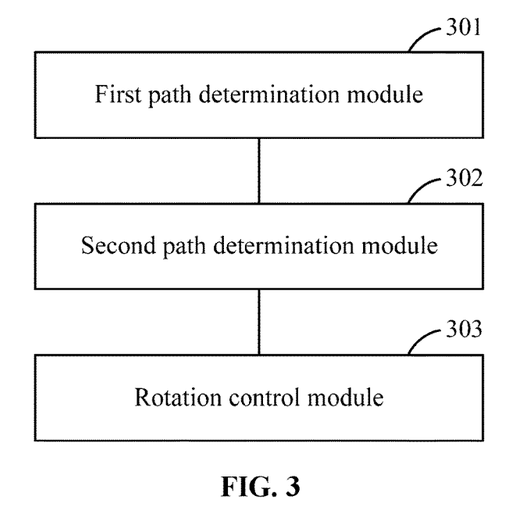
FIG. 3 is a diagram illustrating the structure of a pan-tilt-zoom camera control apparatus according to embodiment three of the present application.

FIG. 3 is a diagram illustrating the structure of a pan-tilt-zoom camera control apparatus according to embodiment three of the present application. The embodiment is applicable to a case of improving the service life of the pan-tilt-zoom camera. Referring to FIG. 3, the apparatus includes a first path determination module 301, a second path determination module 302 and a rotation control module 303. The first path determination module 301 is configured to determine a clockwise path and a counterclockwise path for a pan-tilt-zoom camera to rotate from a current preset position to a target preset position. The second path determination module 302 is configured to select a current rotation path from the clockwise path and the counterclockwise path according to life load values of at least two first position points that the clockwise path needs to pass and life load values of at least two second position points that the counterclockwise path needs to pass. The rotation control module 303 is configured to control the pan-tilt-zoom camera to rotate from the current preset position to the target preset position according to the current rotation path.

Optionally, the apparatus further includes a life load value determination module. The life load value determination module is configured to determine the life load value of a preset position point according to the total number of times that the pan-tilt-zoom camera passes the preset position point in a pan and tilt during a historical rotation process.

Optionally, the second path determination module includes a path life load value determination unit and a path determination unit. The path life load value determination unit is configured to determine the life load value of the clockwise path and the life load value of the counterclockwise path according to the life load values of the at least two first position points that the clockwise path needs to pass and the life load values of the at least two second position points that the counterclockwise path needs to pass, respectively. The path determination unit is configured to compare the life load value of the clockwise path and the life load value of the counterclockwise path, and select the current rotation path from the clockwise path and the counterclockwise path according to a comparison result.

Optionally, the path life load value determination unit is configured to take the largest life load value of the life load values of the at least two first position points that the clockwise path needs to pass as the life load value of the clockwise path; and take the largest life load value of the life load values of the at least two second position points that the counterclockwise path needs to pass as the life load value of the counterclockwise path.

Optionally, the path life load value determination unit is configured to take the average life load value of the life load values of the at least two first position points that the clockwise path needs to pass as the life load value of the clockwise path; and take the average life load value of the life load values of the at least two second position points that the counterclockwise path needs to pass as the life load value of the counterclockwise path.

Optionally, the path determination unit is configured to, in a case where the life load value of the clockwise path is equal to the life load value of the counterclockwise path, take a shorter path of the clockwise path and the counterclockwise path as the current rotation path; in a case where the life load value of the clockwise path is not equal to the life load value of the counterclockwise path, take the path having a smaller life load value of the clockwise path and the counterclockwise path as the current rotation path.

Optionally, the apparatus further includes a largest life load value determination module and a path determination triggering module. The largest life load value determination module is configured to determine the largest life load value among life load values of all preset position points in the pan and tilt. The path determination triggering module is configured to, in a case where the largest life load value is equal to or greater than a rotation life threshold of the pan and tilt, notify the first path determination module 301 of executing the step of determining the clockwise path and the counterclockwise path for the pan-tilt-zoom camera to rotate from the current preset position to the target preset position.

The pan-tilt-zoom camera control apparatus provided in the embodiment of the present application may execute the pan-tilt-zoom camera control method according to any embodiment of the present application and has corresponding functional modules for executing the method.

Embodiment Four

Figure 4:
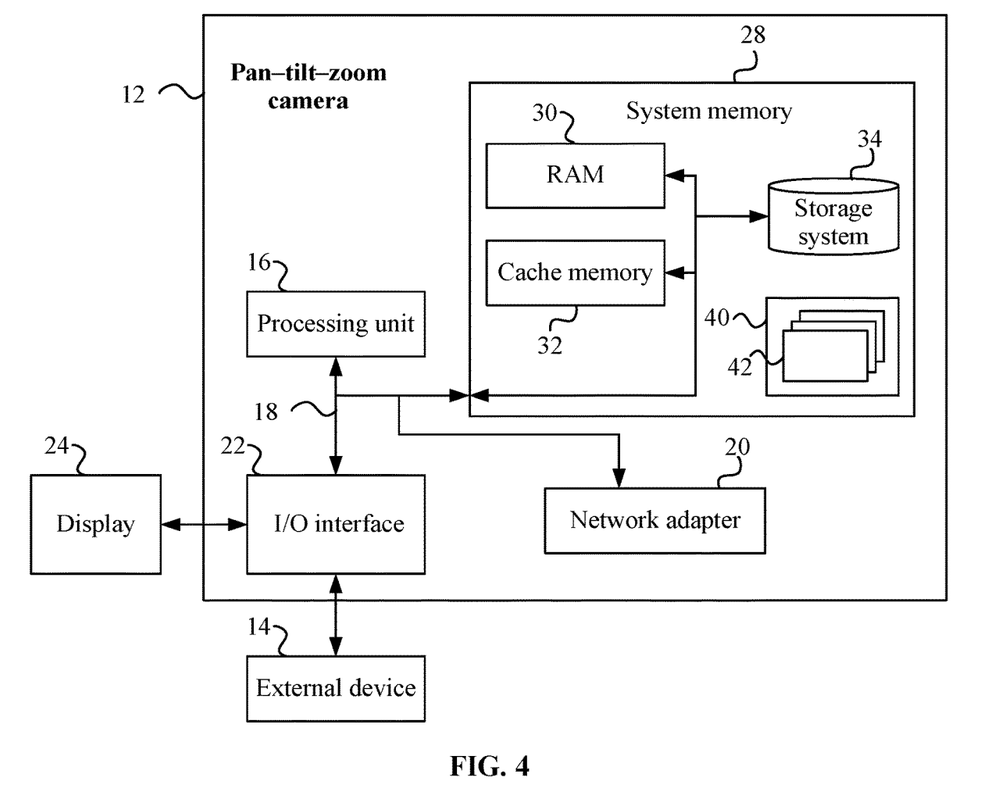
FIG. 4 is a diagram illustrating the structure of a pan-tilt-zoom camera according to embodiment four of the present application.

FIG. 4 is a diagram illustrating the structure of a pan-tilt-zoom camera according to embodiment four of the present application. FIG. 4 illustrates the block diagram of an example pan-tilt-zoom camera 12 applicable to implementing the embodiments of the present application. The pan-tilt-zoom camera 12 shown in FIG. 4 is merely an example and is not intended to limit the function and use scope of the embodiments of the present application.

As shown in FIG. 4, the pan-tilt-zoom camera 12 may take the form of a general-purpose computing device. Components of the pan-tilt-zoom camera 12 may include, but are not limited to, one or more processors or processing units 16, a system memory 28, and a bus 18 connecting different system components (including the system memory 28 and the one or more processing units 16).

The bus 18 represents one or more of several types of bus architectures, including a memory bus or memory controller, a peripheral bus, an accelerated graphics port, a processor, or a local bus using any one of multiple bus architectures. For example, these architectures include, but are not limited to, an Industry Standard Architecture (ISA) bus, a Micro Channel Architecture (MAC) bus, an enhanced ISA bus, a Video Electronics Standards Association (VESA) local bus and a Peripheral Component Interconnect (PCI) bus.

In an embodiment, the pan-tilt-zoom camera 12 includes multiple computer system-readable media. These media may be available media that can be accessed by the pan-tilt-zoom camera 12, including volatile and non-volatile media, and removable and non-removable media.

The system memory 28 may include a computer system—readable medium in the form of a volatile memory, such as a random-access memory (RAM) 30 and/or a cache memory 32. The pan-tilt-zoom camera 12 may further include other removable/non-removable and volatile/non-volatile computer system storage media. Merely exemplarily, a storage system 34 may be configured to read from and write to non-removable and non-volatile magnetic media (not shown in FIG. 4, commonly referred to as a "hard disk drive"). Although not shown in FIG. 4, the storage system 34 may provide a magnetic disk drive for reading from or writing to a removable non-volatile magnetic disk (for example, a "floppy disk"), and an optical disc drive for reading from or writing to a removable non-volatile optical disc (for example, a portable compact disc read-only memory (CD-ROM), a digital video disc—read-only memory (DVD-ROM) or other optical media). In such cases, each drive may be connected to the bus 18 via one or more data medium interfaces. The system memory 28 may include at least one program product having a group of program modules (for example, at least one program module). These program modules are configured to execute the functions of each embodiment of the present application.

A program/utility 40 having a group of program modules 42 (at least one program module 42) may be stored, for example, in the system memory 28. Such program modules 42 include, but are not limited to, an operating system, one or more application programs, other program modules and program data. Each or some combinations of these examples may include implementation of a network environment. The program modules 42 generally execute the functions and/or methods in the embodiments of the present application.

The pan-tilt-zoom camera 12 may communicate with one or more external devices 14 (such as a keyboard, a pointing terminal and a display 24). The pan-tilt-zoom camera 12 may also communicate with one or more devices that enable a user to interact with the pan-tilt-zoom camera 12, and/or with any device (such as a network card or a modem) that enables the pan-tilt-zoom camera 12 to communicate with one or more other computing devices. These communications may be performed through an input/output (I/O) interface 22. Moreover, the pan-tilt-zoom camera 12 may also communicate with one or more networks (for example, a local area network (LAN), a wide area network (WAN), and/or a public network, such as the Internet) through a network adapter 20. As shown in the figure, the network adapter 20 communicates with other modules of the pan-tilt-zoom camera 12 via the bus 18. Although not shown in the figure, other hardware and/or software modules may be used in conjunction with the pan-tilt-zoom camera 12. The other hardware and/or software modules include, but are not limited to, microcode, a device driver, a redundant processing unit, an external disk drive array, a redundant array of independent disks (RAID) system, a tape drive, a data backup storage system and the like.

The one or more processing units 16 execute a program stored in the memory 28 to perform various functional applications and data processing, for example, to implement the pan-tilt-zoom camera control method provided in the embodiments of the present application. The method includes steps described below. A clockwise path and a counterclockwise path for a pan-tilt-zoom camera to rotate from a current preset position to a target preset position are determined. A current rotation path is selected from the clockwise path and the counterclockwise path according to life load values of at least two first position points that the clockwise path needs to pass and life load values of at least two second position points that the counterclockwise path needs to pass. The pan-tilt-zoom camera is controlled to rotate from the current preset position to the target preset position according to the current rotation path.

Embodiment Five

Embodiment five of the present application further provides a non-transitory computer-readable storage medium storing a computer program which, when executed by a processor, implements the pan-tilt-zoom camera control method provided in the embodiments of the present application. The method includes steps described below. A clockwise path and a counterclockwise path for a pan-tilt-zoom camera to rotate from a current preset position to a target preset position are determined. A current rotation path is selected from the clockwise path and the counterclockwise path according to life load values of at least two first position points that the clockwise path needs to pass and life load values of at least two second position points that the counterclockwise path needs to pass. The pan-tilt-zoom camera is controlled to rotate from the current preset position to the target preset position according to the current rotation path.

A computer storage medium in the embodiment of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. Examples (a non-exhaustive list) of the computer-readable storage medium include an electrical connection having one or more wires, a portable computer magnetic disk, a hard disk, a RAM, a read-only memory (ROM), an erasable programmable read-only memory (EPROM), a flash memory, an optical fiber, a CD-ROM, an optical storage device, a magnetic storage device or any suitable combination thereof. In this document, the computer-readable storage medium may be any tangible medium including or storing a program. The program may be used by or used in conjunction with an instruction execution system, apparatus or device.

The computer-readable signal medium may include a data signal propagated on a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable medium may send, propagate or transmit a program used by or used in conjunction with an instruction execution system, apparatus or device.

The program codes contained on the computer-readable medium may be transmitted on any suitable medium, including, but not limited to, the wireless, a wire, an optical cable, a radio frequency (RF), or any suitable combination thereof.

Computer program codes for performing the operations of the present application may be written in one or more programming languages or a combination thereof. The programming languages include object-oriented programming languages such as Java, Smalltalk and C++ and further include conventional procedural programming languages such as C programming language or similar programming languages. The program codes may be executed entirely on a user computer, partly on a user computer, as a stand-alone software package, partly on a user computer and partly on a remote computer, or entirely on a remote computer or a server. In a case relating to the remote computer, the remote computer may be connected to the user computer via any type of network including a local area network (LAN) or a wide area network (WAN), or may be connected to an external computer (for example, via the Internet through an Internet service provider).

What is claimed is:

1. A pan-tilt-zoom camera control method, comprising:
   determining a clockwise path and a counterclockwise path for a pan-tilt-zoom camera to rotate from a current preset position to a target preset position;
   selecting a current rotation path from the clockwise path and the counterclockwise path according to life load values of at least two first position points that the clockwise path needs to pass and life load values of at least two second position points that the counterclockwise path needs to pass, wherein a life load value is used for characterizing a total number of times that the pan-tilt-zoom camera passes a preset position point in a pan and tilt; and
   controlling the pan-tilt-zoom camera to rotate from the current preset position to the target preset position according to the current rotation path,
   wherein selecting the current rotation path from the clockwise path and the counterclockwise path according to the life load values of the at least two first position points that the clockwise path needs to pass and the life load values of the at least two second position points that the counterclockwise path needs to pass comprises:
   determining a life load value of the clockwise path and a life load value of the counterclockwise path according to the life load values of the at least two first position points that the clockwise path needs to pass and the life load values of the at least two second position points that the counterclockwise path needs to pass, respectively; and
   comparing the life load value of the clockwise path and the life load value of the counterclockwise path, and selecting the current rotation path from the clockwise path and the counterclockwise path according to a comparison result,
   wherein determining the life load value of the clockwise path and the life load value of the counterclockwise path according to the life load values of the at least two first position points that the clockwise path needs to pass and the life load values of the at least two second position points that the counterclockwise path needs to pass, respectively comprises:
   taking a largest life load value of the life load values of the at least two first position points that the clockwise path needs to pass as the life load value of the clockwise path; and
   taking a largest life load value of the life load values of the at least two second position points that the counterclockwise path needs to pass as the life load value of the counterclockwise path.

2. The method according to claim 1, wherein before selecting the current rotation path from the clockwise path and the counterclockwise path, the method further comprises:

determining the life load value of the preset position point according to the total number of times that the pan-tilt-zoom camera passes the preset position point in the pan and tilt during a historical rotation process.

3. The method according to claim 1, wherein determining the life load value of the clockwise path and the life load value of the counterclockwise path according to the life load values of the at least two first position points that the clockwise path needs to pass and the life load values of the at least two second position points that the counterclockwise path needs to pass, respectively comprises:

taking an average life load value of the life load values of the at least two first position points that the clockwise path needs to pass as the life load value of the clockwise path; and taking an average life load value of the life load values of the at least two second position points that the counterclockwise path needs to pass as the life load value of the counterclockwise path.

4. The method according to claim 1, wherein selecting the current rotation path from the clockwise path and the counterclockwise path according to the comparison result comprises:

in a case where the life load value of the clockwise path is equal to the life load value of the counterclockwise path, taking a shorter path of the clockwise path and the counterclockwise path as the current rotation path;

in a case where the life load value of the clockwise path is not equal to the life load value of the counterclockwise path, taking a path having a smaller life load value of the clockwise path and the counterclockwise path as the current rotation path.

5. The method according to claim 1, further comprising:

determining a largest life load value among life load values of all preset position points in the pan and tilt; and in a case where the largest life load value is equal to or greater than a rotation life threshold of the pan and tilt, performing the determining the clockwise path and the counterclockwise path for the pan-tilt-zoom camera to rotate from the current preset position to the target preset position.

6. A pan-tilt-zoom camera, comprising:

at least one processor; and a storage apparatus configured to store at least one program;

wherein the at least one program, when executed by the at least one processor, causes the at least one processor to implement:

determining a clockwise path and a counterclockwise path for a pan-tilt-zoom camera to rotate from a current preset position to a target preset position;

selecting a current rotation path from the clockwise path and the counterclockwise path according to life load values of at least two first position points that the clockwise path needs to pass and life load values of at least two second position points that the counterclockwise path needs to pass, wherein a life load value is used for characterizing a total number of times that the pan-tilt-zoom camera passes a preset position point in a pan and tilt; and controlling the pan-tilt-zoom camera to rotate from the current preset position to the target preset position according to the current rotation path, wherein the at least one program, when executed by the at least one processor, causes the at least one processor to implement:

determining a life load value of the clockwise path and a life load value of the counterclockwise path according to the life load values of the at least two first position points that the clockwise path needs to pass and the life load values of the at least two second position points that the counterclockwise path needs to pass, respectively; and comparing the life load value of the clockwise path and the life load value of the counterclockwise path, and selecting the current rotation path from the clockwise path and the counterclockwise path according to a comparison result, wherein the at least one program, when executed by the at least one processor, causes the at least one processor to implement:

taking a largest life load value of the life load values of the at least two first position points that the clockwise path needs to pass as the life load value of the clockwise path; and taking a largest life load value of the life load values of the at least two second position points that the counterclockwise path needs to pass as the life load value of the counterclockwise path.

7. A non-transitory computer-readable storage medium configured to store a computer program, wherein the computer program, when executed by a processor, implements:

determining a clockwise path and a counterclockwise path for a pan-tilt-zoom camera to rotate from a current preset position to a target preset position;

selecting a current rotation path from the clockwise path and the counterclockwise path according to life load values of at least two first position points that the clockwise path needs to pass and life load values of at least two second position points that the counterclockwise path needs to pass, wherein a life load value is used for characterizing a total number of times that the pan-tilt-zoom camera passes a preset position point in a pan and tilt; and controlling the pan-tilt-zoom camera to rotate from the current preset position to the target preset position according to the current rotation path, wherein the computer program, when executed by the processor, implements:

determining a life load value of the clockwise path and a life load value of the counterclockwise path according to the life load values of the at least two first position points that the clockwise path needs to pass and the life load values of the at least two second position points that the counterclockwise path needs to pass, respectively; and comparing the life load value of the clockwise path and the life load value of the counterclockwise path, and selecting the current rotation path from the clockwise path and the counterclockwise path according to a comparison result, wherein the computer program, when executed by the processor, implements:

taking a largest life load value of the life load values of the at least two first position points that the clockwise path needs to pass as the life load value of the clockwise path; and taking a largest life load value of the life load values of the at least two second position points that the counterclockwise path needs to pass as the life load value of the counterclockwise path.

8. The pan-tilt-zoom camera according to claim 6, wherein the at least one program, when executed by the at least one processor, causes the at least one processor to implement:
  determining the life load value of the preset position point according to the total number of times that the pan-tilt-zoom camera passes the preset position point in the pan and tilt during a historical rotation process.

9. The pan-tilt-zoom camera according to claim 6, wherein the at least one program, when executed by the at least one processor, causes the at least one processor to implement:
  taking an average life load value of the life load values of the at least two first position points that the clockwise path needs to pass as the life load value of the clockwise path; and
  taking an average life load value of the life load values of the at least two second position points that the counterclockwise path needs to pass as the life load value of the counterclockwise path.

10. The pan-tilt-zoom camera according to claim 6, wherein the at least one program, when executed by the at least one processor, causes the at least one processor to implement:
  in a case where the life load value of the clockwise path is equal to the life load value of the counterclockwise path, taking a shorter path of the clockwise path and the counterclockwise path as the current rotation path;
  in a case where the life load value of the clockwise path is not equal to the life load value of the counterclockwise path, taking a path having a smaller life load value of the clockwise path and the counterclockwise path as the current rotation path.

11. The pan-tilt-zoom camera according to claim 6, wherein the at least one program, when executed by the at least one processor, causes the at least one processor to implement:
  determining a largest life load value among life load values of all preset position points in the pan and tilt; and
  in a case where the largest life load value is equal to or greater than a rotation life threshold of the pan and tilt, performing the determining the clockwise path and the counterclockwise path for the pan-tilt-zoom camera to rotate from the current preset position to the target preset position.

12. The non-transitory computer-readable storage medium according to claim 7, wherein the computer program, when executed by the processor, implements:
  determining the life load value of the preset position point according to the total number of times that the pan-tilt-zoom camera passes the preset position point in the pan and tilt during a historical rotation process.

13. The non-transitory computer-readable storage medium according to claim 7, wherein the computer program, when executed by the processor, implements:
  taking an average life load value of the life load values of the at least two first position points that the clockwise path needs to pass as the life load value of the clockwise path; and
  taking an average life load value of the life load values of the at least two second position points that the counterclockwise path needs to pass as the life load value of the counterclockwise path.

14. The non-transitory computer-readable storage medium according to claim 10, wherein the computer program, when executed by the processor, implements:
  in a case where the life load value of the clockwise path is equal to the life load value of the counterclockwise path, taking a shorter path of the clockwise path and the counterclockwise path as the current rotation path;
  in a case where the life load value of the clockwise path is not equal to the life load value of the counterclockwise path, taking a path having a smaller life load value of the clockwise path and the counterclockwise path as the current rotation path.

* * * * *